United States Patent [19]

Skantz et al.

[11] Patent Number: 4,576,643

[45] Date of Patent: Mar. 18, 1986

[54] RUST PREVENTIVE AND PROCESS FOR THE PREPARATION THEREOF

[75] Inventors: Kaj M. Skantz, Nikkilae; Ari R. E. Christiansen, Espoo, both of Finland

[73] Assignee: Shell Internationale Research Maatschappij B.V., The Hague, Netherlands

[21] Appl. No.: 625,498

[22] Filed: Jun. 28, 1984

[30] Foreign Application Priority Data

Jul. 1, 1983 [FI] Finland ............................ 832428

[51] Int. Cl.$^4$ .............................................. C04B 9/02
[52] U.S. Cl. ................................ 106/14.24; 106/14.27; 260/97.5
[58] Field of Search .................... 260/97.5; 106/14.24, 106/14.27

[56] References Cited

U.S. PATENT DOCUMENTS 2,603,571 7/1952 Castellano .................... 260/97.5
3,080,330 3/1963 Rudel ............................ 106/14.29

Primary Examiner—Lorenzo B. Hayes

[57] ABSTRACT

Rust preventive containing as binder agent a talloil pitch esterified by means of an alcohol and having an acid number between 0 and 15 mg KOH/g and a process for preparing a binder agent by esterifying a talloil pitch having an acid number between 17 and 50 mg KOH/g with one or more alcohols.

7 Claims, No Drawings

RUST PREVENTIVE AND PROCESS FOR THE PREPARATION THEREOF

The invention is concerned with a rust preventive, containing as binder agent a certain talloil pitch as well as with a process for the preparation of such rust preventive. Talloil pitch, which is used as a raw-material for rust preventives in accordance with the present invention, is produced as large quantities as a distillation residue on refining of crude talloil. It has not been possible thusfar to find better use for talloil pitch than burning it in power plants, in spite of the fact that talloil pitch contains the abietic acids and fatty acids of the crude talloil as valuable components. Talloil pitch can be characterized by means of the softening point, acid number, and the saponification number, of which the acid number is the most important factor, because on its basis, the quantity of alcohol needed for the esterification of talloil pitch is calculated.

Several processes have been suggested in the art for the preparation of binder agents for coatings out of talloil pitch. For example, it is known from "Tall Oil and its Uses", by Zachary L. G., Bajak, H. W., and Eveline, F. J., McGraw-Hill Inc., New York, 1965, page 49, that polyol esters of talloil pitch can be prepared by using maleic acid anhydride as the modifying agent and pentaerythritol as the alcohol. Under unfavourable conditions, the high acid number (15 to 20) of the final product obtained by this prior-art proces will act as a catalyst for corrosion. Moreover, this process is highly energy-consuming in commercial production because a reaction temperature of 275° C. is required, which temperature is, moreover, above the autoignition temperature (240° C.) of pentaerythritol. The use of maleic acid anhydride, which belongs to the sensitizing agents is also inconvenient in industrial practice.

Processes are also known for the modification of talloil pitch by means of calcium oxide (see, e.g., Finnish Pat. No. 58, 933). It is a drawback of these processes that calcium-oxide must be used in excessive quantities, whereas the removal of unreacted solid calcium oxide is difficult.

It has now been found that rust preventives in accordance with the invention containing certain talloil pitch esters have a good spraying quality and a good adhesive capacity, also on moist metal face.

The present invention thus relates to rust preventives containing as binder agent a talloil pitch esterified by means of an alcohol and having an acid number between 0 and 15 mg KOH/g.

Preferably, the rust preventives according to the present invention contain binding agents having an acid number between 0 and 7 mg KOH/g.

The rust preventives according to the present invention preferably contain esterified talloil pitch wherein the esterification has been performed by using an alcohol component consisting partly or fully of an unsaponified fraction of talloil.

The rust preventives according to the present invention may contain solvents such as petroleum spirits. Amounts of up to 25 %w, preferably between 10 and 20 %w can be suitably applied. The rust preventives may further contain one or more corrosion inhibitors such as calcium- or magnesium sulphonates, calcium or magnesium alkylsalicylates, oxidized petrolatum, sarcosines or modified imidazolines. Corrosion inhibitors, which boost the corrosion inhibition intrinsic to talloil pitch esters, can be added in amounts of from 0.1 to 20 %w.

The rust preventives according to the present invention can be suitably prepared by esterifying talloil pitch having an acid number between 17 and 50 mg KOH/g by means of an alcohol or a mixture of alcohols. The process according to the present invention is suitably carried out in such a way that the alcohol used in the esterification consists partly or fully of an unsaponified fraction of talloil.

The process according to the present invention can also be carried out in the presence of a softener alcohol such as a $C_9$-$C_{11}$ alcohol. Preferably the process is carried out in two or more steps using a softener alcohol having a high boiling point in the first step, which is performed near the reflux temperature, and a softener alcohol of a lower boiling point in the second step. Corrosion inhibitors and/or solvents may be added to the talloil pitch ester obtained. It is possible to use a catalyst, such as p-toluene-sulphonic acid in the esterification.

It is an advantage of the process according to the present invention that the reaction product obtained can be used as such, because it does not contain substantial quantities of unreacted reaction components and does not contain any excess solvents at all.

In corrosion tests performed (SFS 4086 and 4087) it has been noticed that rust preventives according to the present invention are highly efficient.

The invention is illustrated by means of the following Examples.

EXAMPLE 1

200 g Talloil pitch, having an acid number of 24 mg KOH/g, 133 g of an unsaponified fraction of talloil, and 105 g of a $C_9$-$C_{11}$ softener alcohol (LINEVOL 911, manufactured by Shell Chemicals U.K.) were mixed together. The mixture was heated to 225° C. and kept at that temperature constantly under stirring for 3 hours. The acid number of the product was 9 mg KOH/g, and it was translucent, of a middle brown colour. After dilution with 15 percent by weight of petroleum spirit, the product was readily sprayable. It formed an even, well adhering, resilient film.

EXAMPLE 2

(a) 200 g Talloil pitch, having an acid number of 17 mg KOH/g, 53 g of an unsaponified fraction of tall oil, and 25 g of a $C_9$-$C_{11}$ softener alcohol as described in Example 1 were mixed together, and the mixture was heated at 220° C. for 2 hours. Thereupon, 5 g of a $C_7$-$C_9$ softener alcohol (LINEVOL 79, manufactured by Shell Chemicals U.K.), were added, and the mixture was heated at 205° C. for half an hour. The acid number of the product was 5 mg KOH/g.

(b) To the product obtained under (a) were added 15 percent by weight of petroleum spirit and 15 percent by weight of a calcium-sulphonate-based inhibitor (SACl 700 A, WITCO CHEMICALS, (USA)).

On spraying, the product formed an even, well adhering, resilient film, which had good properties as regards inhibition of corrosion.

EXAMPLE 3

(a) 200 g Talloil pitch, having an acid number of 16 mg KOH/g, 62 g of an unsaponified fraction of talloil, and 20 g of a $C_9$-$C_{11}$ softener alcohol as described in Example 1 were mixed together, and the mixture was heated at 248° C. for 2 hours. Thereupon, 5 g of a C₇–C₉ softener alcohol as described in Example 2 were added, and the mixture was heated at 205° C. for half an hour. The acid number of the product was 3 mg KOH/g.

(b) To the product obtained under (a) were added, 15 percent by weight of petroleum spirit, 10 percent by weight of oxidized petrolatum (DP100, manufacturer Croda Ltd, England), 0.5 percent by weight of N-acyl-sarcosine (Sarkosyl O, manufacturer Ciba-Geigy, Switzerland), and 0.5 percent by weight of imidazoline modified by means of an amine (Amine O, manufacturer Ciba-Geigy). The product was in particular suitable as a penetrating protective agent for box structures in vehicles.

EXAMPLE 4

(a) 200 g Talloil pitch, having an acid number of 35 mg KOH/g, 140 g of an unsaponified fraction of talloil, and 100 g of a C₉–C₁₁ softener alcohol as described in Example 1 were mixed together, and the mixture was heated at 240° C. for 4 hours. The acid number of the product was 10 mg KOH/g.

(b) To the product obtained under a were added 15 percent by weight of petroleum spirit and 15 percent by weight of calcium-sulphonate-based inhibitor (SAC, 700 A, WITCO CHEMICAL, USA). On spraying, the product formed an even, well adhering, resilient film, which had good properties as regards inhibition of corrosion.

EXAMPLE 5

(a) 200 g Talloil pitch, having an acid number of 35 mg KOH/g, 140 g of an unsaponified fraction of talloil, and 100 g of a C₉–C₁₁ softener alcohol as described in Example 1 were mixed together, and the mixture was heated at 240° C. for 4 hours. The acid number of the product was 10 mg KOH/g.

(b) To the product obtained under (a) were added 15 percent by weight of petroleum spirit, 10 percent by weight of oxidized petrolatum (DP 100, manufacturer Croda Ltd, England), 0.5 percent by weight of N-acyl-sarcosine (Sarkosyl O, manufacturer Ciba-Geigy, Switzerland), and imidazoline modified by means of an amine (Amine O, manufacturer Ciba-Geigy). The product was in particular suitable as a penetrating protective agent for box structures in vehicles.

We claim:

1. Rust preventative containing, as a binder agent, a tall oil pitch ester having an acid number between 0 and 15 mg KOH/g wherein the tall oil pitch ester is produced by esterifying tall oil pitch having an acid number between 17 and 50 mg KOH/g with alcohol comprising alcohol derived from unsaponifiable fraction of tall oil.

2. Rust preventive according to claim 1, wherein the acid number of the tall oil pitch ester binder agent is between 0 and 7 mg KOH/g.

3. Rust preventive according to claim 1 or 2, which additionally contains a solvent.

4. Rust preventive according to claim 1 or 2 which additionally contains a corrosion inhibitor.

5. Process for the preparation of a binder agent for a rust preventative comprising esterifying tall oil pitch having an acid number between 17 and 50 mg KOH/g with alcohol, to provide a tall oil pitch ester having an acid number between 0 and 15 mg KOH/g, wherein said alcohol comprises alcohol from unsaponifiable fraction of tall oil.

6. Process according to claim 5, wherein the esterification is carried out in two or more steps.

7. Process according to claim 5 or 6, wherein said alcohol also comprises softener alcohol selected from the group consisting of C₉–C₁₁ aliphatic alcohols and mixtures thereof with C₇–C₉ aliphatic alcohols.

* * * * *